(12) United States Patent
Moriyama et al.

(10) Patent No.: US 11,598,420 B2
(45) Date of Patent: Mar. 7, 2023

(54) SEAL RING, CROSS SHAFT COUPLING, INTERMEDIATE SHAFT ASSEMBLY, STEERING DEVICE

(71) Applicant: NSK LTD., Tokyo (JP)

(72) Inventors: Seiichi Moriyama, Maebashi (JP); Masaki Takahashi, Maebashi (JP)

(73) Assignee: NSK LTD., Tokyo (JP)

( * ) Notice: Subject to any disclaimer, the term of this patent is extended or adjusted under 35 U.S.C. 154(b) by 167 days.

(21) Appl. No.: 17/046,406

(22) PCT Filed: Apr. 11, 2019

(86) PCT No.: PCT/JP2019/015790
§ 371 (c)(1),
(2) Date: Oct. 9, 2020

(87) PCT Pub. No.: WO2019/203114
PCT Pub. Date: Oct. 24, 2019

(65) Prior Publication Data
US 2021/0116031 A1    Apr. 22, 2021

(30) Foreign Application Priority Data

Apr. 18, 2018 (JP) ............................. JP2018-079753

(51) Int. Cl.
*B62D 1/02* (2006.01)
*F16J 15/3204* (2016.01)
*F16D 3/41* (2006.01)

(52) U.S. Cl.
CPC ............ *F16J 15/3204* (2013.01); *B62D 1/02* (2013.01); *F16D 3/41* (2013.01); *F16D 2250/0046* (2013.01); *F16D 2300/08* (2013.01)

(58) Field of Classification Search
CPC ......... F16D 2300/08; F16D 2250/0046; F16D 3/41; B62D 1/02; F16J 15/3204
See application file for complete search history.

(56) References Cited

U.S. PATENT DOCUMENTS 2,996,901 A  *  8/1961  Kleinschmidt ....... F16C 21/005
                                                    464/131
4,154,490 A  *  5/1979  Kohler .................... F16D 3/385
                                                    464/131
(Continued)

FOREIGN PATENT DOCUMENTS

CN    205278119 U    6/2016
JP    61-23528 U    2/1986
(Continued)

OTHER PUBLICATIONS

International Search Report for PCT/JP2019/015790 dated Jun. 18, 2019 [PCT/ISA/210].

(Continued)

*Primary Examiner* — Eugene G Byrd
(74) *Attorney, Agent, or Firm* — Sughrue Mion, PLLC

(57) ABSTRACT

A seal ring (26) configured to be employed with a cross shaft (16) including a center section (17) and four shaft sections (18a, 18b, 18c, 18d) extending in four directions from the center section and formed with step faces (17a) where the center section widens out from base ends of the shaft sections outward in radial directions of the shaft sections, and with bearings (21) for mounting to leading end portions of the shaft sections. The seal ring is fitted over the shaft section and interposed between the bearing and the step face. The seal ring includes a seal lip (34) configured to contact the step face around the entire circumference, and an indentation (36) the seal lip enters by deforming when mounted to the cross shaft.

20 Claims, 19 Drawing Sheets

(56) References Cited

U.S. PATENT DOCUMENTS

| | | | | |
|---|---|---|---|---|
| 4,377,312 | A | * | 3/1983 | Zackrisson ............... F16D 3/41 464/131 |
| 4,515,574 | A | * | 5/1985 | Mazziotti ............ F16C 33/7809 464/131 |
| 4,943,262 | A | * | 7/1990 | Schultze ............... F16C 21/005 464/131 |
| 5,454,759 | A | | 10/1995 | Kretschmer et al. |
| 6,059,663 | A | * | 5/2000 | Jones ................. F16C 33/7809 464/133 |
| 6,406,373 | B1 | * | 6/2002 | Gibson ................. F16D 3/385 464/131 |
| 6,814,668 | B2 | * | 11/2004 | Grupido ................. F16D 3/385 277/401 |
| 6,893,350 | B2 | * | 5/2005 | Menosky ................. F16D 3/41 464/136 |
| 2004/0166947 | A1 | * | 8/2004 | Mizuno ................. F16D 3/385 464/131 |
| 2010/0289226 | A1 | | 11/2010 | Kobayashi |
| 2013/0237330 | A1 | * | 9/2013 | Higuchi ................ F16C 21/005 384/564 |
| 2021/0071714 | A1 | * | 3/2021 | Ishii ........................ F16C 33/20 |

FOREIGN PATENT DOCUMENTS

| | | | |
|---|---|---|---|
| JP | 3041732 | U | 10/1997 |
| JP | 2007-055380 | A | 3/2007 |
| JP | 2009-092223 | A | 4/2009 |
| JP | 2009-257406 | A | 11/2009 |
| JP | 2013-155806 | A | 8/2013 |
| JP | 2015-105688 | A | 6/2015 |
| JP | 2019128026 | A * | 8/2019 |

OTHER PUBLICATIONS

Communication dated Jul. 27, 2021 from the Japanese Patent Office in JP Application No. 2019-075544.

* cited by examiner

SEAL RING, CROSS SHAFT COUPLING, INTERMEDIATE SHAFT ASSEMBLY, STEERING DEVICE

CROSS REFERENCE TO RELATED APPLICATIONS

This application is a National Stage of International Application No. PCT/JP2019/015790 filed Apr. 11, 2019, claiming priority based on Japanese Patent Application No. 2018-079753 filed Apr. 18, 2018.

TECHNICAL FIELD

The present application relates to a seal ring employed in across shaft coupling that transmits steering force of a steering device, and to a cross shaft coupling equipped with such a seal, an intermediate shaft assembly equipped with such a cross shaft coupling, and a steering device equipped with such an intermediate shaft assembly.

BACKGROUND ART

Hitherto there have been seal ring to seal a gap arising between a shaft section of a cross shaft, and a bearing cup of a bearing that is fitted over an end portion of the cross shaft so as to configure a cross shaft coupling.

RELATED ART LITERATURE

Patent Documents

Patent Document 1: Japanese Utility Model Registration No. 3041732

SUMMARY OF INVENTION

Technical Problem

With the seal ring described in Patent Document 1, ingress of water into a bearing from a back face stopper side might occur under harsh usage conditions, giving rise to concerns regarding corrosion.

In consideration of the above circumstances, an object of the present invention is to provide a seal ring giving excellent sealing performance, and the provision of a cross shaft coupling, intermediate shaft assembly, and steering device of the same.

Solution to Problem

In order to solve the above issues, the seal ring of the present application is employed with a cross shaft including a center section and four shaft sections extending in four directions from the center section and formed with step faces where the center section widens out from base ends of the shaft sections outward in radial directions of the shaft sections, and with bearings for mounting to the shaft sections. The seal ring is fitted over the shaft section and is interposed between the bearing and the step face. The seal ring includes a seal lip configured to contact the step face, and includes an indentation the seal lip enters when the seal lip is deformed by the contact. This enables the sealing performance of the seal ring to be raised.

The seal lip preferably contacts the step face and deforms toward a radial direction inside. This enables the step face to be made smaller, so as to enable the cross shaft to be made more compact.

The seal ring preferably includes a seat configured to contact the step face. This facilitates positioning of the seal ring, and also enables the sealing performance between the seal ring and the step face to be raised.

The seal lip, the indentation, and the seat are preferably disposed in this sequence as a sequence from the radial direction outside. This enables an increase in friction surface between the seat and the cross shaft, enabling the sealing performance to be raised while preventing accompanying rotation of the seal ring with the bearing.

The seal ring preferably further includes an annular core member having a higher rigidity than that of other portions thereof. This enables a deterioration in seal lip tension to be suppressed from occurring.

A portion of the core member preferably configures the seat. Positioning of the seal lip is thereby more accurately performed, enabling a deterioration in sealing performance due to positional misalignment to be prevented from occurring.

The core member preferably includes a positioning portion exposed toward the shaft section radial direction outside or inside. This facilitates molding of the seal lip.

The core member preferably includes a flange portion widening out in a radial direction around an entire circumference of the core member. The integration between the core member and the seal lip is raised thereby, enabling the seal lip tension to be further prevented from deteriorating.

An outer peripheral portion of the flange portion preferably includes radial direction indentations and projections. This enables the bearing-side seal lip and the step-face-side seal lip to be integrally formed.

The seat preferably includes a portion of the core member projecting further toward the step face side than the flange portion. This enables accurate positioning of the seal lip while forming an indentation into which the seal lip enters.

The core member preferably includes a reinforcement portion disposed at a radial direction inside of the flange portion and having a center axis line direction dimension greater than that of the flange portion around an entire circumference. This raises the rigidity of the core member, enabling accompanying rotation of the seal together with the bearing to be prevented from occurring.

In order to solve the above issues, a cross shaft coupling of the present application includes the above seal ring. This enables provision of a cross shaft coupling giving excellent sealing performance.

In order to solve the above issues, an intermediate shaft assembly of the present application includes the above cross shaft coupling. This enables provision of an intermediate shaft assembly giving excellent sealing performance.

The above intermediate shaft assembly is preferably subjected to plating. This enables provision of an intermediate shaft assembly giving even more excellent sealing performance.

In order to solve the above issues, a steering device of the present application includes the above intermediate shaft assembly. This enables provision of a steering device giving excellent sealing performance.

Advantageous Effects

The present invention enables provision of a seal giving excellent sealing performance, and the provision of a cross shaft coupling, intermediate shaft assembly, and steering device of the same.

DESCRIPTION OF EMBODIMENTS

First Exemplary Embodiment

Figure 1:
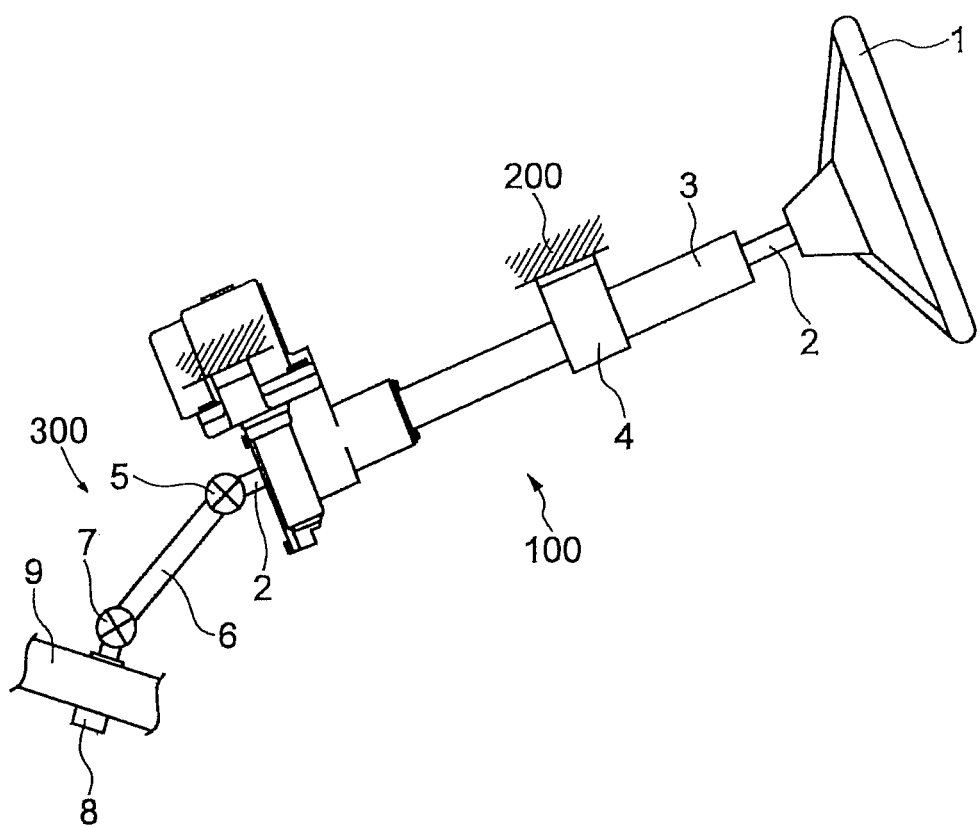
FIG. 1 is a side view illustrating a steering device according to a first exemplary embodiment of the present application.

Explanation follows regarding a first exemplary embodiment of the present application, with reference to the drawings. FIG. 1 is a side view illustrating a steering device 100 according to the first exemplary embodiment of the present application.

As illustrated in FIG. 1, the steering device 100 includes a steering wheel 1, a steering shaft 2, a steering column 3, a vehicle-body-side bracket 4, a first cross shaft coupling 5, an intermediate shaft 6, a second cross shaft coupling 7, a pinion gear 8, and a rack shaft 9. The steering wheel 1 is fixed to a driver-side end portion of the steering shaft 2 for transmitting rotation of the steering wheel 1. The steering shaft 2 passes through the inside of the steering column 3 and is supported by the steering column 3 so as to be rotatable about a center axis line. The steering column 3 is attached to a vehicle body 200 by the vehicle-body-side bracket 4. Rotation of the steering shaft 2 is transmitted to the intermediate shaft 6 by the first cross shaft coupling 5. Rotation of the intermediate shaft 6 is transmitted to the pinion gear 8 by the second cross shaft coupling 7. The first cross shaft coupling 5, the intermediate shaft 6, and the second cross shaft coupling 7 configure an intermediate shaft assembly 300. The pinion gear 8 rotates and moves the rack shaft 9 in a vehicle width direction. The rack shaft 9 moves a non-illustrated knuckle arm through a non-illustrated tie rod, and thereby steers non-illustrated front wheels of the vehicle.

Figure 2:
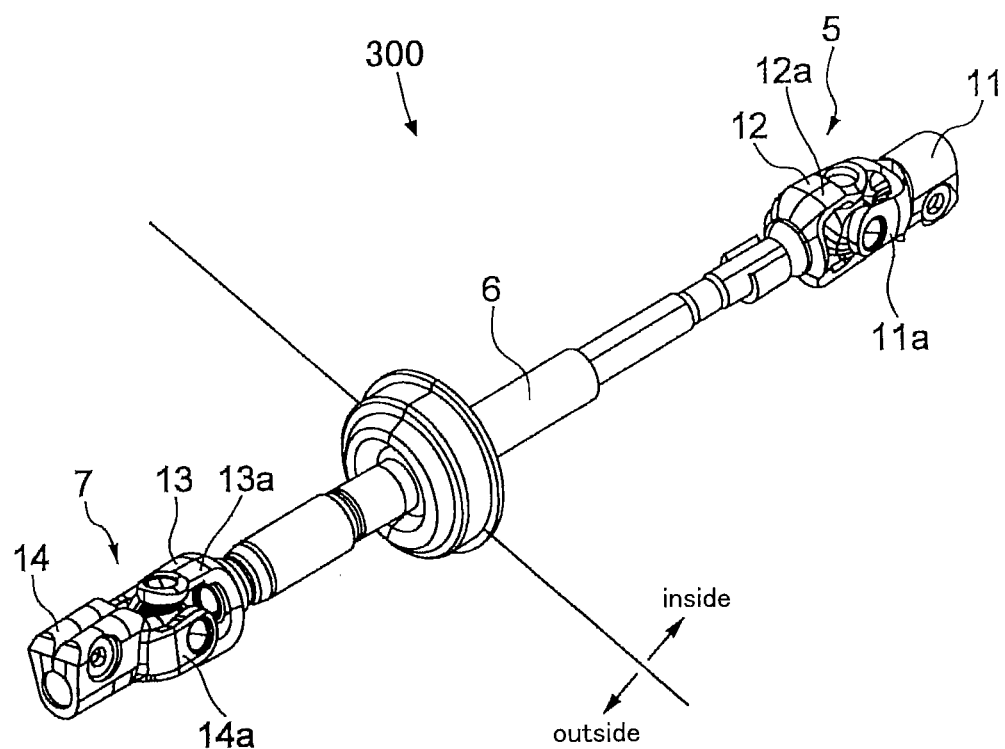
FIG. 2 is a perspective view illustrating an intermediate shaft assembly according to the first exemplary embodiment of the present application.

FIG. 2 is a perspective view illustrating the intermediate shaft assembly 300 according to the first exemplary embodiment of the present application.

The first cross shaft coupling 5 includes a first yoke 11 and a second yoke 12. The second cross shaft coupling 7 includes a third yoke 13 and a fourth yoke 14. The first yoke 11 is bifurcated to form a pair of arms 11a. The second yoke 12 is bifurcated to form a pair of arms 12a. The first yoke 11 and the second yoke 12 are coupled together through a cross shaft 16, described later, that is retained by the pair of arms 11a and the pair of arms 12a. Similarly, the third yoke 13 and the fourth yoke 14 are also coupled together through a cross shaft 16, described later, and retained by a pair of arms 13a and a pair of arms 14a.

Figure 3:
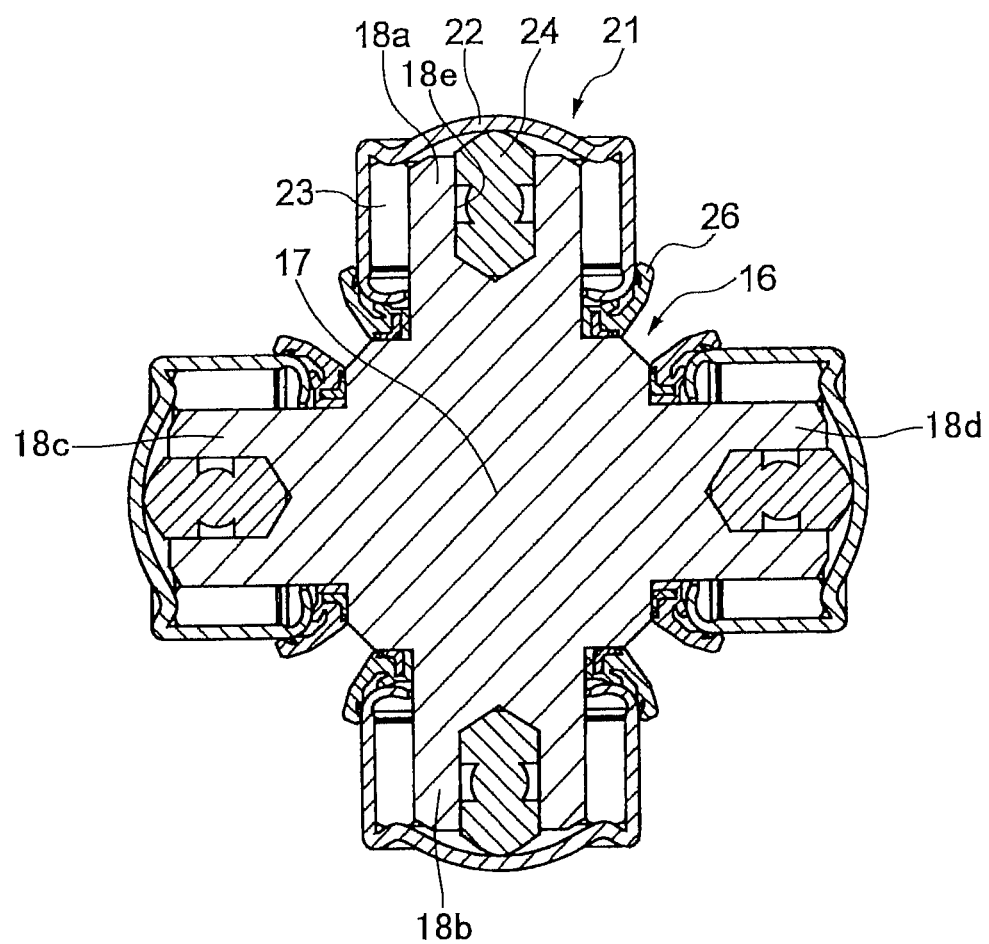
FIG. 3 is a cross-section of a cross shaft, bearings, and seal rings according to the first exemplary embodiment of the present application.

FIG. 3 is a cross-section of the cross shaft 16, bearings 21, pins 24, and seal rings 26 according to the first exemplary embodiment of the present application. This cross-section is sectioned along a direction perpendicular to the center axis line of the intermediate shaft 6 illustrated in FIG. 2.

The cross shaft 16 includes a center section 17, and four circular pillar shaped shaft sections 18a, 18b, 18c, 18d extending in four respective directions from the center section 17. Specifically, the cross shaft 16 includes a first shaft section 18a extending in one direction from the center section 17, a second shaft section 18b having a common center axis line to the first shaft section 18 and extending from the center section 17 in the opposite direction to the first shaft section 18a, a third shaft section 18c extending from the center section 17 in a direction perpendicular to the first and second shaft sections 18a, 18b, and a fourth shaft section 18d having a common center axis line to the third shaft section 18c and extending from the center section 17 in the opposite direction to the third shaft section 18c. The configuration at the vicinity of the shaft sections 18a, 18b, 18c, 18d is common for each of the four shaft sections 18a, 18b, 18c, 18d. Only the vicinity of the shaft section 18a will accordingly be described, and description of the configuration at the vicinity of the other shaft sections 18b, 18c, 18d will be omitted. The bearing 21 is fitted over a leading-end-side portion of the shaft section 18a. A radial bearing such as a needle bearing may be employed as the bearing 21. The bearing 21 includes a bearing cup 22 and plural rollers 23. The bearing cups 22 are fitted inside respective holes formed in the pairs of arms 11a to 14a of the yokes 11 to 14. The plural rollers 23 are arranged along a circumferential direction between the bearing cup 22 and the shaft section 18a of the cross shaft 16 and have an orientation substantially parallel to the shaft section 18a.

An insertion hole 18e is formed in the shaft section 18a from a leading end thereof toward a base end side thereof. The pin 24 made from a synthetic resin is inserted inside the insertion hole 18e. The seal ring 26 is fitted over the base end of the shaft section 18a. The seal ring 26 prevents foreign matter from entering the bearing 21 through the gap between the bearing cup 22 and the shaft section 18a. The pin 24 is interposed between the bearing cup 22 and the shaft section 18a and prevents movement of the bearing cup 22 toward the base end side of the shaft section 18a. This enables the seal ring 26 to be prevented from being compressed by the bearing cup 22 to the detriment of sealing performance. The seal rings 26 may be omitted from a cross shaft coupling provided inside a vehicle cabin, as in the first cross shaft coupling 5 illustrated in FIG. 2.

Figure 4:
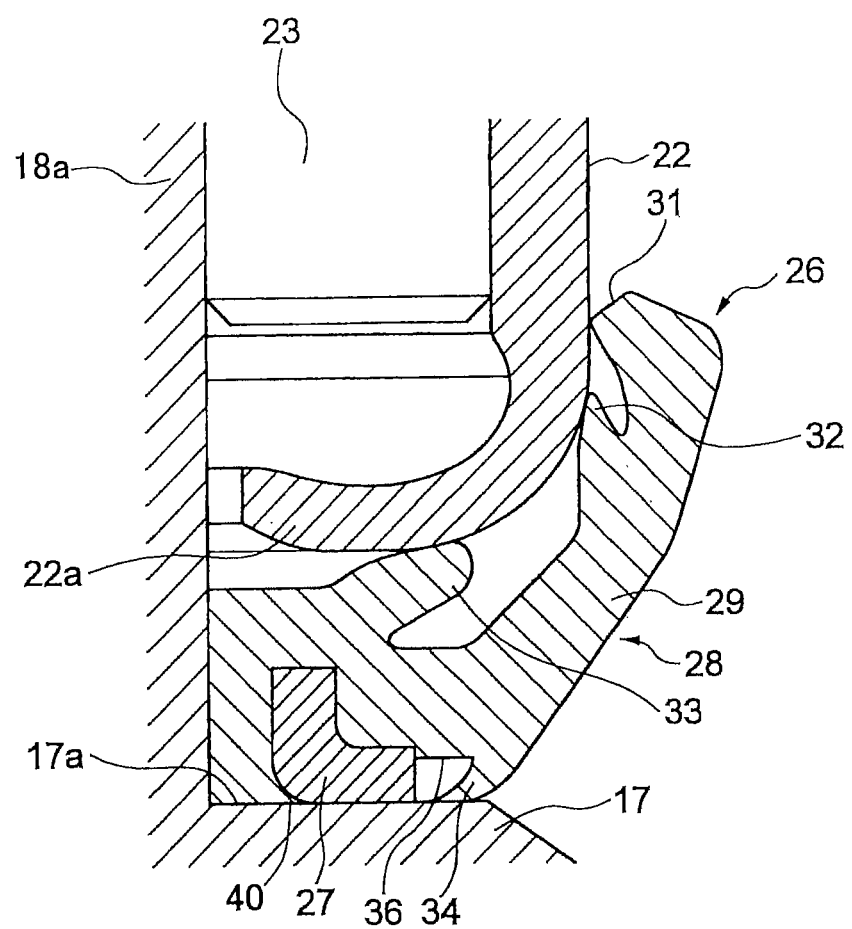
FIG. 4 is an enlarged cross-section of the vicinity of a seal ring according to the first exemplary embodiment of the present application.

FIG. 4 is an enlarged cross-section of the vicinity of the seal ring 26 according to the first exemplary embodiment of the present application. A similar cross-section profile to that of the portion illustrated in FIG. 4 is employed around the entire circumference. In the following, unless particularly stated otherwise, "center axis line direction" means the direction of the center axis line of the shaft section 18a, and "radial direction" means a radial direction of the shaft section 18a.

The seal ring 26 includes a core member 27 and an elastic member 28. The core member 27 has a circular ring shape and is made from a material of higher rigidity than the elastic member 28, such as from a metal or resin. The elastic member 28 may be formed from an elastomer, such as a nitrile rubber, a hydrogenated nitrile rubber, a fluoro-rubber, or a silicone rubber. In cases in which, as described above, the intermediate shaft assembly 300 has been subjected to plating, the elastic member 28 is preferably formed from a fluoro-rubber. The elastic member 28 has the core member 27 embedded therein and is adhered thereto. The elastic member 28 has a circular ring shape. The center section 17 of the cross shaft 16 has a step face 17a formed thereon that is larger than the shaft section 18a in the radial direction, and that widens out from the base end of the shaft section 18a toward the radial direction outside. The step face 17a in FIG. 4 extends at substantially a right angle with respect to the center axis line of the shaft section 18a, however, there is no limitation to extending at substantially a right angle with respect to the center axis line. The elastic member 28 contacts the bearing cup 22 and the step face 17a, and prevents foreign matter such as dirty water from entering the bearing cup 22.

Figure 5:
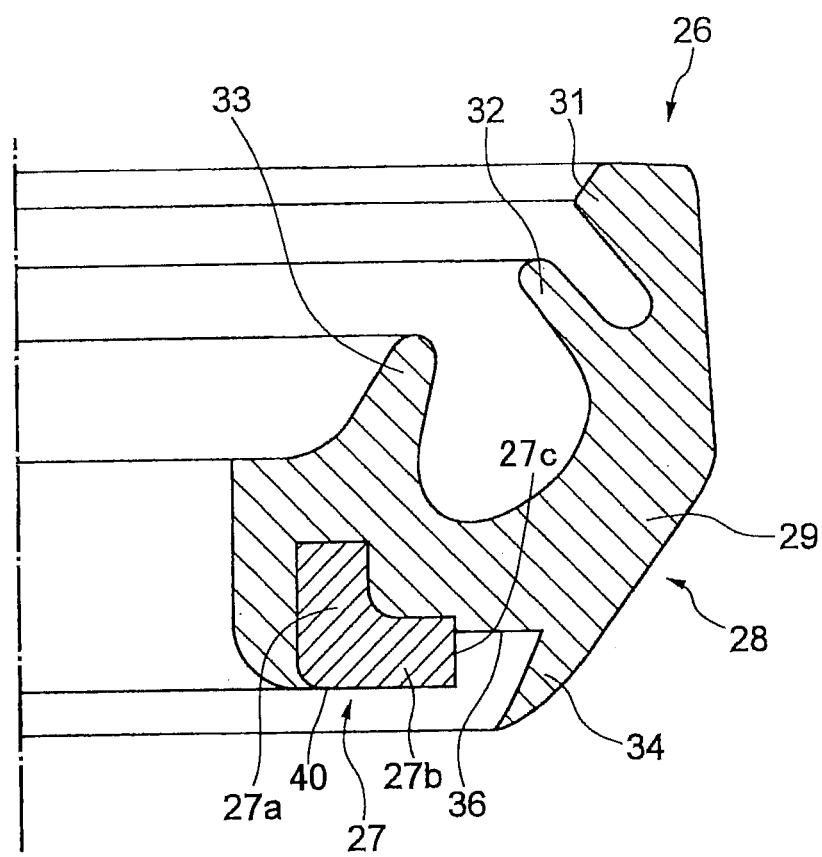
FIG. 5 is a cross-section of the seal ring according to the first exemplary embodiment of the present application.

FIG. 5 is a cross-section of the seal ring 26 according to the first exemplary embodiment of the present application. The entire circumference of the seal ring 26 has a similar cross-section profile thereto.

The core member 27 includes a cylindrical portion 27a having a cylindrical shape at the radial direction inside, and a flange portion 27b extending toward the radial direction outside from the outer periphery of the cylindrical portion 27a. The cylindrical portion 27a performs the role of a reinforcement portion so as to raise the rigidity of the core member 27. The seal ring 26 is thereby firmly mounted to the shaft section 18a, and the seal ring 26 is thereby prevented from rotating together with the bearing cup 22. Note that a cylindrical profile is not necessarily employed for the reinforcement portion, as long as the dimension along the center axis line direction thereof is larger than that of the flange portion 27b around the entire circumference.

The elastic member 28 has the cross-section profile illustrated in FIG. 5 when in a state not mounted to the cross shaft 16. The elastic member 28 includes a body 29, a first seal lip 31 on the bearing 21 side, a second seal lip 32 on the bearing 21 side, a third seal lip 33 on the bearing 21 side, and a seal lip 34 on the step face 17a side. The body 29 of the elastic member 28 is adhered to the core member 27 at the bearing 21 side in the center axis line direction, and at the inside in the radial direction. A face of the core member 27 on the step face 17a side in the center axis line direction is not adhered to elastic member 28 and is exposed. Moreover, the radial direction outside face of the flange portion 27b is also exposed, except for at a portion thereof on the bearing 21 side in the center axis line direction. The exposed faces of the core member 27 may be employed to position the core member 27 by making these contact a mold when molding the elastic member 28. In particular, the radial direction outside face of the flange portion 27b is configured with a positioning portion 27c that enables the core member 27 to be centered by being abutted against a mold when molding the elastic member 28.

The body 29 of the elastic member 28 extends from around the entire circumference the core member 27 outward in the radial direction and upward toward the bearing 21 side in the center axis line direction. The first seal lip 31 projects toward the radial direction inside around the entire circumference from a portion of the body 29 at a position furthermost toward the bearing 21 side in the center axis line direction. The first seal lip 31 makes press contact with the outer peripheral face of the bearing cup 22 of the bearing 21, as illustrated in FIG. 4.

The second seal lip 32 projects toward the radial direction inside around the entire circumference by projecting from a portion of the body 29 that lies between the core member 27 and the first seal lip 31 and is situated more toward the first seal lip 31. The second seal lip 32 has a conical surface profile inclined with respect to the center axis line of the shaft section 18a such that the inner diameter and the outer diameter of the second seal lip 32 decreases on progression along the center axis line direction toward the bearing 21 side. The second seal lip 32 makes press contact with the outer peripheral face of the bearing cup 22 of the bearing 21, as illustrated in FIG. 4.

The third seal lip 33 projects toward the bearing 21 side around the entire circumference from a portion of the body 29 disposed at the bearing 21 side of the core member 27 in the center axis line direction. The third seal lip 33 has a conical surface profile inclined with respect to the center axis line of the shaft section 18a such that the inner diameter and the outer diameter of the third seal lip 33 increases on progression along the center axis line direction toward the bearing 21 side. The third seal lip 33 makes press contact with an inner curved portion 22a of the bearing cup 22, as illustrated in FIG. 4.

The seal lip 34 on the step face 17a side projects toward the step face 17a side around the entire circumference from a portion of the body 29 on the radial direction outside of the core member 27. A leading end of the seal lip 34 has an acute angled cross-section profile. The seal lip 34 has a conical surface profile inclined with respect to the center axis line of the shaft section 18a such that the inner diameter and the outer diameter of the seal lip 34 decreases on progression along the center axis line direction toward the step face 17a side. Due to the seal lip 34 deforming toward the radial direction inside when the seal 26 has been mounted to the cross shaft 16, the step face 17a that contacts the seal lip 34 can be made smaller so as to enable the cross shaft couplings 5, 7 to be made more compact.

An annular indentation 36 is formed between the seal lip 34 and the core member 27 in the radial direction. A seat 40 is configured by a portion of the core member 27 and by a portion of the elastic member 28 that contact the step face 17a at the radial direction inside of the annular indentation 36. The seat 40 can be utilized for positioning the seal ring 26. As illustrated in FIG. 4, when the seal ring 26 is fitted over the shaft section 18a of the cross shaft 16 so as to contact the step face 17a of the cross shaft 16, the seat 40 can be arranged so as to appropriately position the seal ring 26. In such a state the seal lip 34 elastically deforms toward the shaft section 18a side and enters the indentation 36. This accordingly enables a large interference to be set for the seal lip 34, enabling stable and high sealing performance to be realized. Similarly to the seal lip 34, the seat 40 also performs the role of preventing ingress of foreign matter into the bearing 21 from the step face 17a side. The indentation 36 secures a space for the seal lip 34, and by causing the seat 40 to reliably make contact with the step face 17a, enables more stable and higher sealing performance to be realized.

The intermediate shaft assembly 300 illustrated in FIG. 2 may be subjected to plating when in an assembled state. The type of plating employed may be electro galvanizing, zinc-nickel plating, or the like. Baking treatment to remove hydrogen needs to be performed for cases in which plating treatment is performed. When baking treatment is performed, although the elastic member 28 might plastically deform, which would lead to a concern regarding a deterioration in seal tension, in the present exemplary embodiment the seal tension can be prevented from deteriorating due to the presence of the core member 27. Moreover, ingression of plating pre-treatment liquids inside the bearing cup 22 can be prevented by the stable and high sealing performance of the present exemplary embodiment.

First Reference Example

Figure 6:
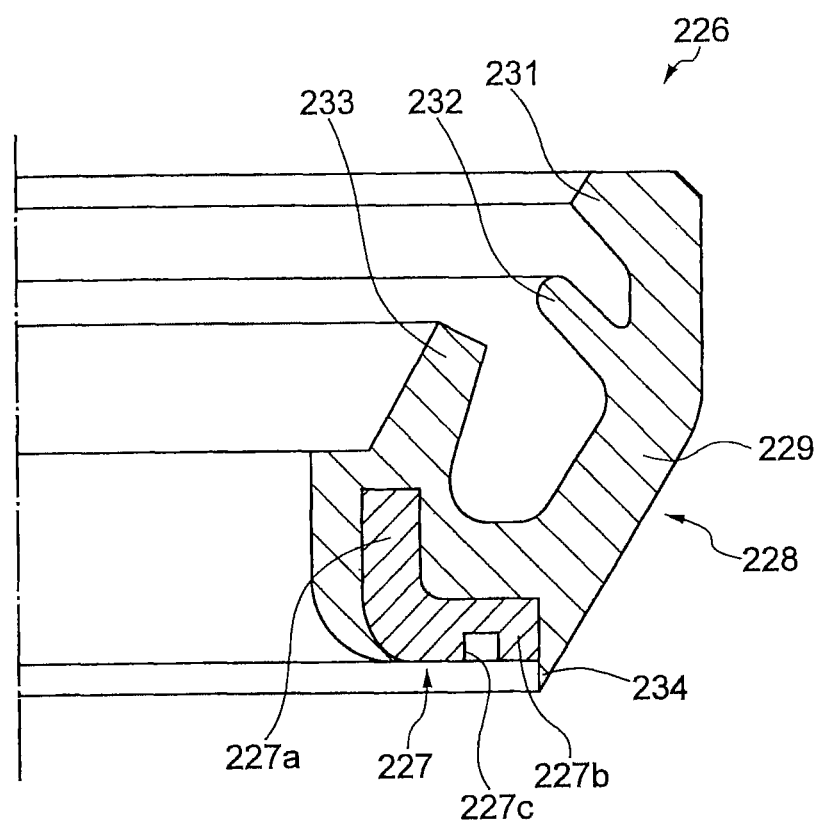
FIG. 6 is a cross-section of a seal according to a first reference example of the present application.
Figure 7:
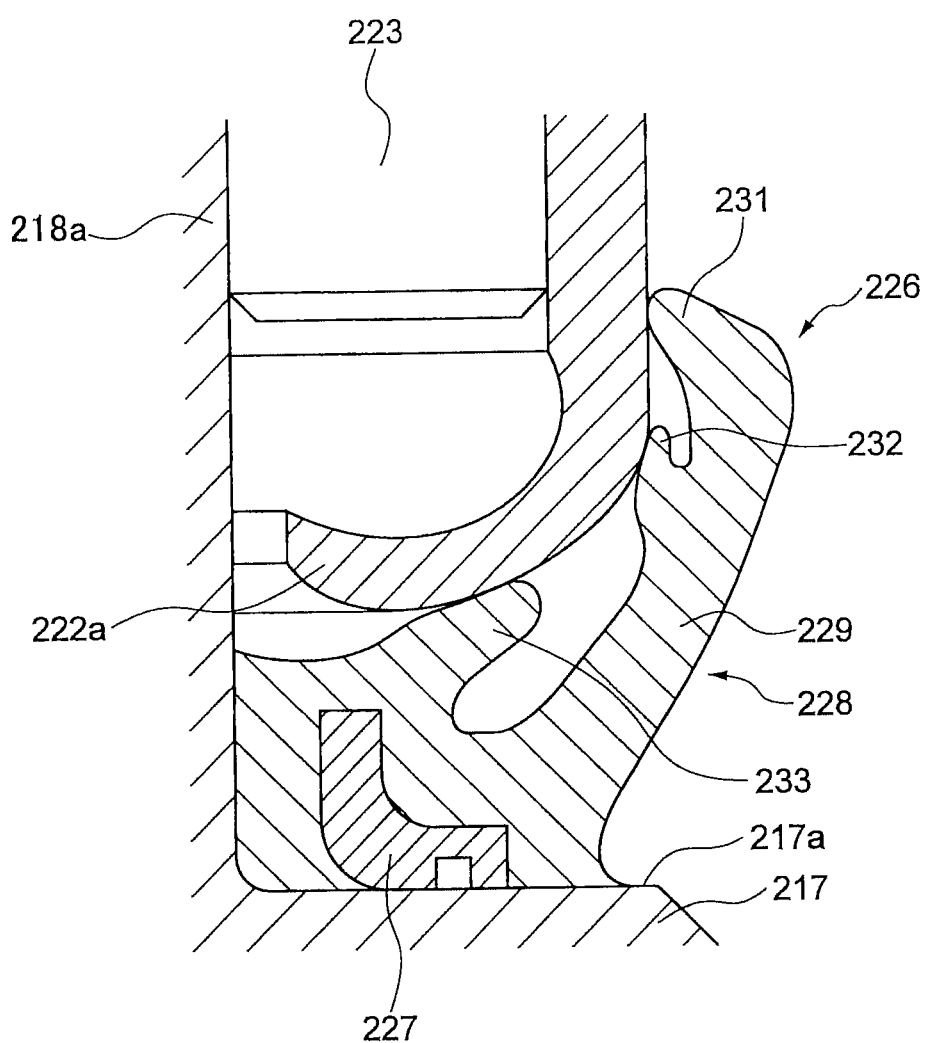
FIG. 7 is an enlarged cross-section of the vicinity of the seal ring according to the first reference example of the present application.

Explanation follows regarding a first reference example of the present application, with reference to FIG. 6 and FIG. 7. FIG. 6 is a cross-section of a seal ring 226 according to the first reference example of the present application. FIG. 7 is an enlarged cross-section of the vicinity of the seal ring 226 when mounted to a cross shaft coupling.

The present first reference example has many common points to the first exemplary embodiment, and so only the points that differ from the first exemplary embodiment will be described. Parts of the present first reference example that correspond to reference-numeral-appended parts already described in the first exemplary embodiment will be appended with reference numerals that are the corresponding reference numeral employed in the first exemplary embodiment to which a numerical value of "200" has been added. For example, the reference numeral "227" is appended to a core member in the present first reference example corresponding to the core member 27 of the first exemplary embodiment.

The present first reference example differs from the first exemplary embodiment in that an elastic member 228 is adhered to the radial direction outer face of a flange portion 227b. Moreover, a positioning portion 227c is formed to the flange portion 227b as an indentation in a face lying on a step face 217a side of the flange portion 227b. The positioning portion 227c can be used to center the core member 227 by being abutted against a mold when molding the elastic member 228. The positioning portion 227c may be formed in a continuous circular shape concentric to the core member 227, or may be formed so as to be intermittent along the circumferential direction. Moreover, the positioning portion 227c may be a portion indented so that the inside thereof forms a space having a columnar profile, semi-spherical profile, quadrangular columnar profile, or the like.

Second Exemplary Embodiment

Figure 8:
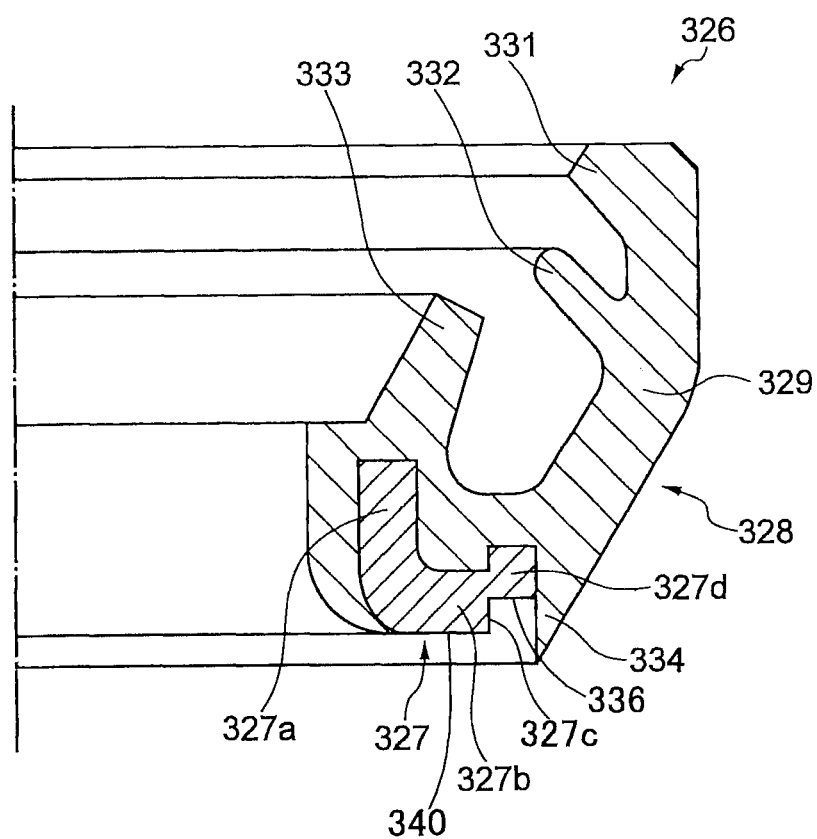
FIG. 8 is a cross-section of a seal ring according to a second exemplary embodiment of the present application.

Next description follows of a second exemplary embodiment of the present application, with reference to FIG. 8. FIG. 8 is a cross-section of a seal ring 326 according to the present second exemplary embodiment.

The present second exemplary embodiment has many common points to the first exemplary embodiment, and so only the points that differ from the first exemplary embodiment will be described. Parts of the present second exemplary embodiment that correspond to reference-numeral-appended parts described in the first exemplary embodiment will be appended with reference numerals that are the corresponding reference numeral employed in the first exemplary embodiment to which a numerical value of "300" has been added. For example, the reference numeral "327" is appended to a core member in the present second exemplary embodiment corresponding to the core member 27 of the first exemplary embodiment.

The present second exemplary embodiment differs from the first exemplary embodiment in that an annular portion 327d is integrally formed to a radial direction outside portion of a flange portion 327b. An elastic member 328 is adhered to the radial direction outer face of the annular portion 327d. The annular portion 327d is arranged such that a face of the annular portion 327d on a cross shaft step face side is disposed further toward a bearing side in a center axis line direction than a face of the flange portion 327b on the cross shaft step face side, and such that an indentation 336 is formed in a radial direction outside portion of the flange portion 327b. A positioning portion 327c is configured by a portion of the flange portion 327b where the indentation 336 is formed, and the positioning portion 327c can be employed to center the core member 327 by being abutted against a mold when molding the elastic member 328. A portion at a step face side of the flange portion 327b in the center axis line direction configures a seat 340 for making contact with the step face of the cross shaft. An outer diameter of a step-face-side seal lip 334 becomes smaller on progression toward the step face side in the center axis line direction. The inner diameter of the seal lip 334 is substantially uniform over the entire range along the center axis line direction.

According to the present second exemplary embodiment, the seal lip 334 enters the indentation 336 when the seal ring 326 has been mounted to the cross shaft. The interference of the seal lip 334 is thereby made larger, enabling stable and high sealing performance to be realized. Moreover, securing space for the seal lip 334 and making the seat 340 contact the step face of the cross shaft reliably, enables more stable and higher sealing performance to be realized.

Second Reference Example

Figure 9:
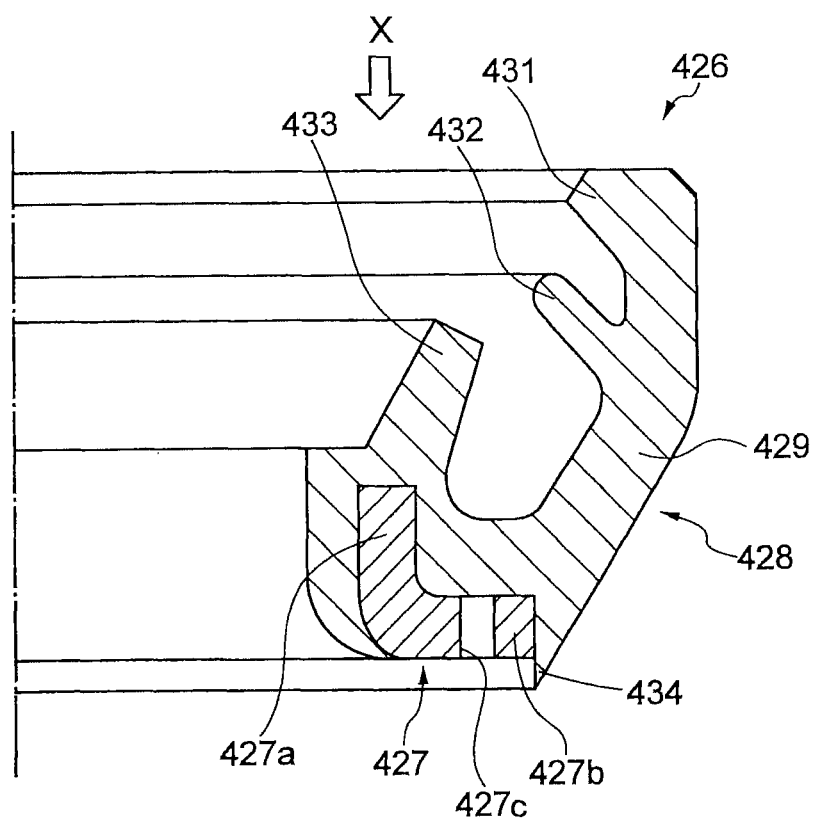
FIG. 9 is a cross-section of a seal ring according to a second reference example of the present application.
Figure 10:
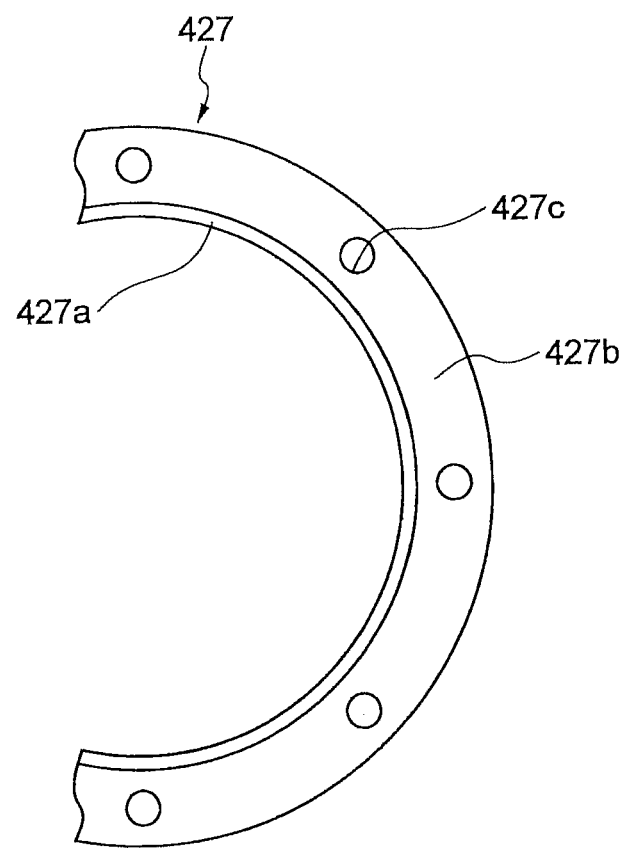
FIG. 10 illustrates a core member of a seal ring according to the second reference example of the present application, as viewed along arrow X of FIG. 9.

Next, description follows regarding a second reference example of the present application, with reference to FIG. 9 and FIG. 10. FIG. 9 is a cross-section of a seal ring 426 according to a second reference example of the present application. FIG. 10 illustrates a core member 427 of the seal ring 426 according to the second reference example of the present application, as viewed along arrow X of FIG. 9. FIG.

10 illustrates the core member 427 prior to an elastic member 428 being adhered thereto.

The present second reference example has many common points to the first exemplary embodiment, and so only the points that differ from the first exemplary embodiment will be described. Parts of the present second reference example that correspond to reference-numeral-appended parts already described in the first exemplary embodiment will be appended with reference numerals that are the corresponding reference numeral employed in the first exemplary embodiment to which a numerical value of "400" has been added. For example, the reference numeral "427" is appended to the core member in the present second reference example corresponding to the core member 27 of the first exemplary embodiment.

The present second reference example differs from the first exemplary embodiment in that the elastic member 428 is adhered to a radial direction outside face of a flange portion 427b. Moreover, as positioning portions 427c, through holes are formed in the flange portion 427b along the center axis line direction. Plural of the positioning portions 427c are arranged so as to be separated from each other along a circumferential direction, as illustrated in FIG. 10. The positioning portions 427c may be employed to center the core member 427 by abutting a mold when molding the elastic member 428. In order to perform centering, either an exposed portion of the positioning portions 427c facing toward the radial direction outside, or an exposed portion of the positioning portions 427c facing toward the radial direction inside, or both, may be abutted against the mold.

Third Exemplary Embodiment

Figure 11:
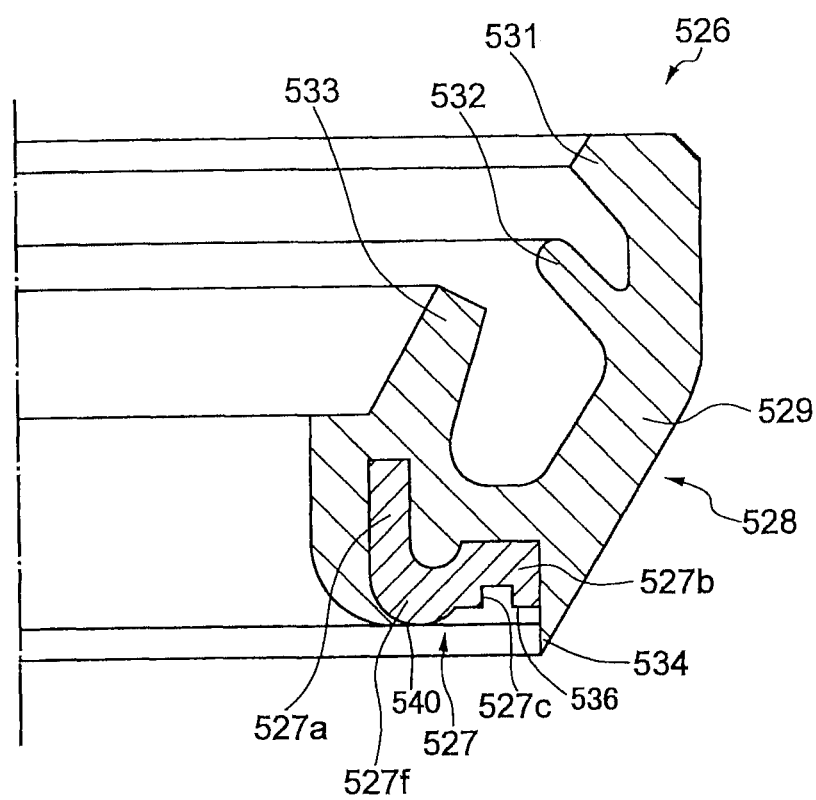
FIG. 11 is a cross-section of a seal according to a third exemplary embodiment of the present application.
Figure 12:
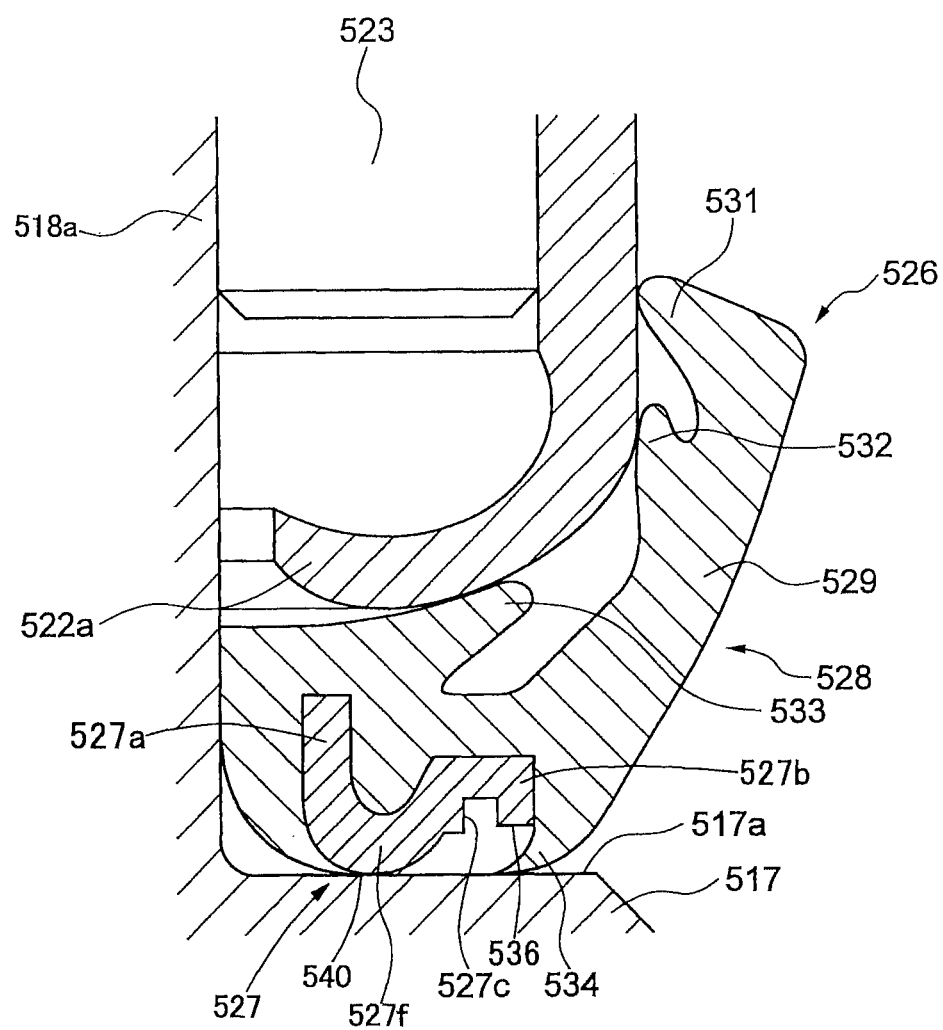
FIG. 12 is an enlarged cross-section of the vicinity of the seal ring according to the third exemplary embodiment of the present application.

Next, description follows regarding a third exemplary embodiment of the present application, with reference to FIG. 11 and FIG. 12. FIG. 11 is a cross-section of a seal ring 526 according to the present third exemplary embodiment. FIG. 12 is an enlarged cross-section illustrating the vicinity of the seal ring 526 when mounted to a cross shaft coupling.

The third exemplary embodiment has many common points to the first exemplary embodiment, and so only the points that differ from the first exemplary embodiment will be described. Parts of the present third exemplary embodiment that correspond to reference-numeral-appended parts already described in the first exemplary embodiment will be appended with reference numerals that are the corresponding reference numeral employed in the first exemplary embodiment to which a numerical value of "500" has been added. For example, the reference numeral "527" is appended to a core member in the present third exemplary embodiment corresponding to the core member 27 of the first exemplary embodiment.

The present third exemplary embodiment differs from the first exemplary embodiment in that an elastic member 528 is adhered to a radial direction outside face of a flange portion 527b. Moreover, a convex curved portion 527f is formed around the entire circumference of a step face side of the core member 527 in the center axis line direction, and a cylindrical portion 527a and the flange portion 527b are formed so as to be integrated together through the curved portion 527f. The curved portion 527f has a substantially U-shaped profile in cross-section sectioned along the radial direction. A portion on a step face 517a side of the curved portion 527f in the center axis line direction configures a seat 540 which contacts the step face 517a. An indented profile positioning portion 527c is formed to a face on the step face 517a of the flange portion 527b. The positioning portion 527c may be employed to center the core member 527 by being made to contact a mold when molding the elastic member 528. As illustrated in FIG. 11, the outer diameter of a step-face-side seal lip 534 is smaller on progression along the center axis line direction toward the step face 517a. The inner diameter of the step-face-side seal lip 534 is substantially uniform over the entire center axis line direction range thereof.

According to the present third exemplary embodiment, an indentation 536 is formed by the curved portion 527f, and as illustrated in FIG. 12, the seal lip 534 enters the indentation 536 when the seal ring 526 has been mounted to a cross shaft. The interference of the seal lip 534 is thereby made larger, enabling stable and high sealing performance to be realized. Moreover, securing space for the seal lip 534 and making the seat 540 contact the step face of the cross shaft reliably, enables more stable and higher sealing performance to be realized.

Fourth Exemplary Embodiment

Figure 13:
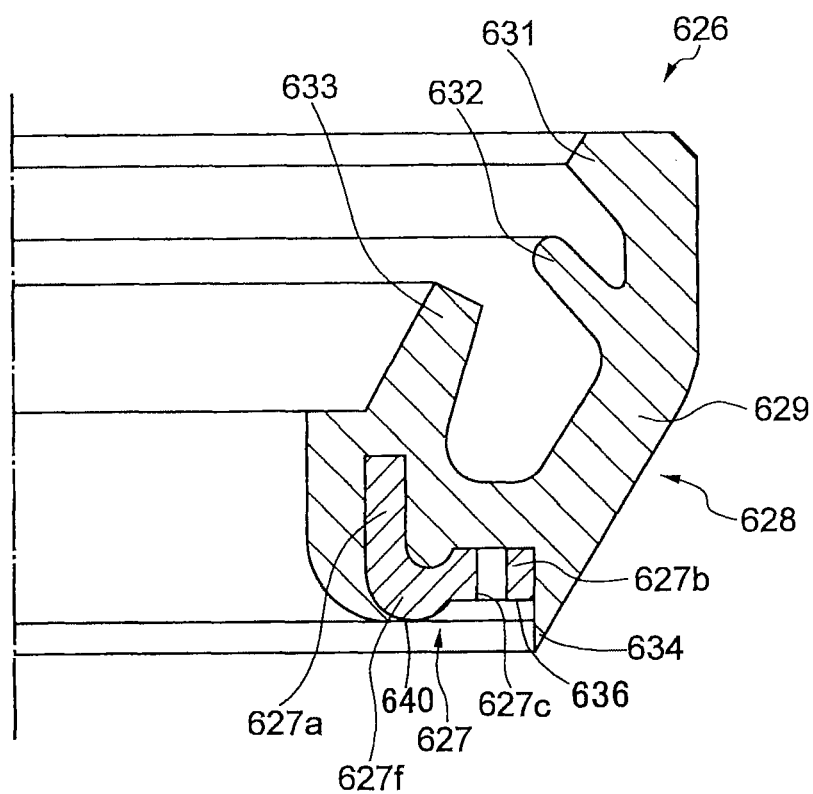
FIG. 13 is a cross-section of a seal ring according to a fourth exemplary embodiment of the present application.

Next, description follows regarding a fourth exemplary embodiment of the present application, with reference to FIG. 13. FIG. 13 is a cross-section of a seal ring 626 according to the present fourth exemplary embodiment.

The present fourth exemplary embodiment has many common points to the first exemplary embodiment, and so only the points that differ from the first exemplary embodiment will be described. Parts of the present fourth exemplary embodiment that correspond to reference-numeral-appended parts already described in the first exemplary embodiment will be appended with reference numerals that are the corresponding reference numeral employed in the first exemplary embodiment to which a numerical value of "600" has been added. For example, the reference numeral "627" is appended to a core member in the present fourth exemplary embodiment corresponding to the core member 27 of the first exemplary embodiment.

The present fourth exemplary embodiment differs from the first exemplary embodiment in that an elastic member 628 is adhered to a radial direction outside face of a flange portion 627b. Moreover, in the present fourth exemplary embodiment, a convex curved portion 627f is formed around the entire circumference of a step face side in the center axis line direction. A cylindrical portion 627a and the flange portion 627b are formed so as to be integrated together through the curved portion 627f. The curved portion 627f has a substantially U-shaped profile in cross-section sectioned along a radial direction of the core member 627. A portion on a cross shaft step face side of the curved portion 627f in the center axis line direction of the curved portion 627f configures a seat 640 which contacts the step face of the cross shaft. A positioning portion 627c is formed so as to pass through the flange portion 627b along the center axis line direction. The positioning portion 627c may be employed to center the core member 627 by being made to contact a mold when molding the elastic member 628.

According to the present fourth exemplary embodiment, an indentation 636 is formed by the curved portion 627f, and similarly to in the third exemplary embodiment described above, a step-face-side seal lip 634 enters the indentation 636 when the seal ring 626 has been mounted to a cross shaft. The interference of the seal lip 634 is thereby made larger, enabling stable and high sealing performance to be realized. Moreover, securing space for the seal lip 634 and making the seat 640 contact the step face of the cross shaft reliably, enables more stable and higher sealing performance to be realized.

Fifth Exemplary Embodiment

Figure 14:
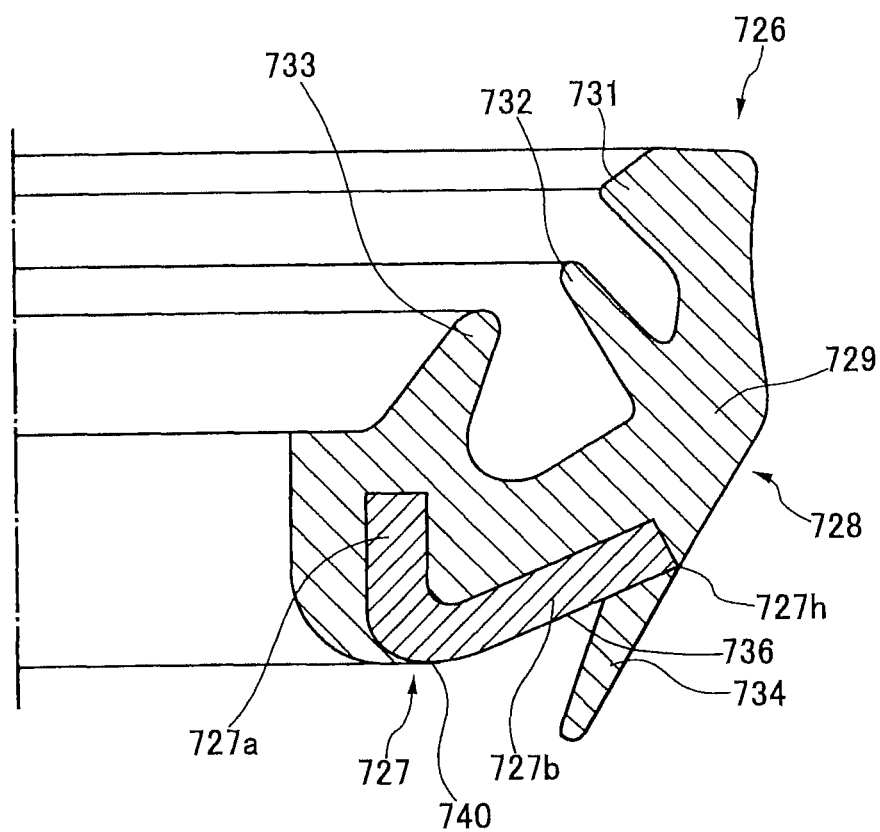
FIG. 14 is a cross-section of a seal ring according to a fifth exemplary embodiment of the present application.
Figure 15:
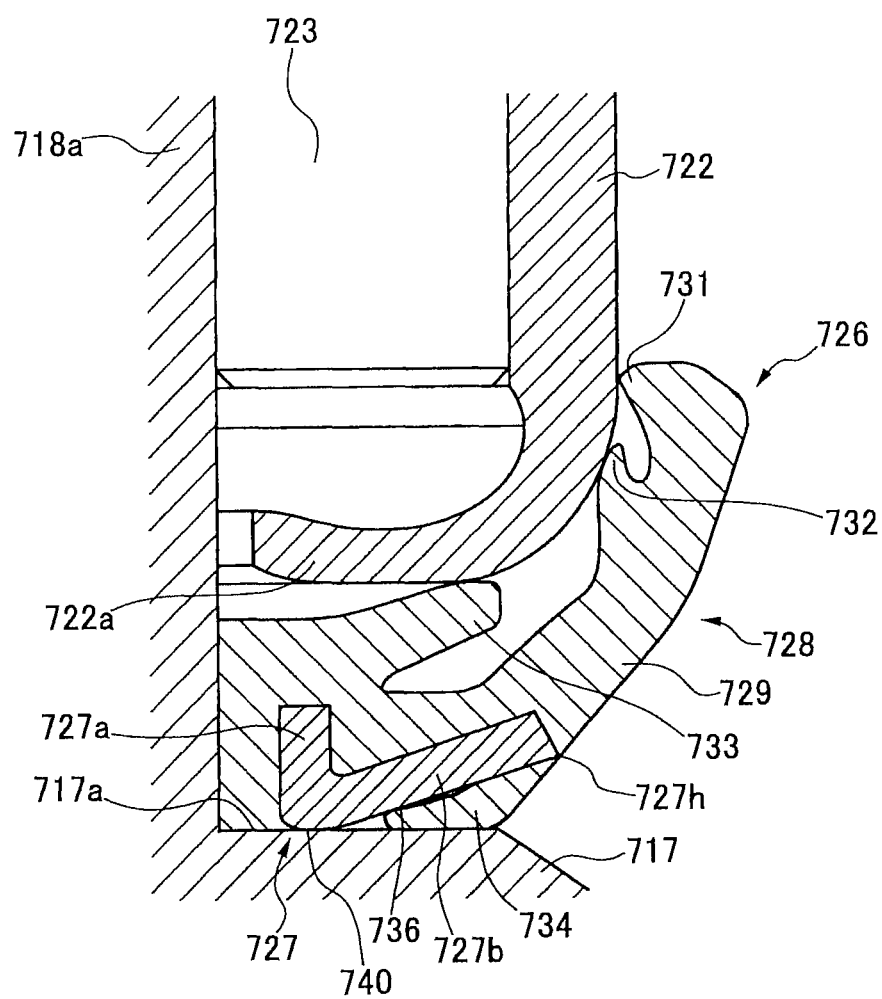
FIG. 15 is an enlarged cross-section of the vicinity of the seal ring according to the fifth exemplary embodiment of the present application.

Next, description follows regarding a fifth exemplary embodiment of the present application. FIG. 14 is a cross-section of a seal ring 726 according to the present fifth exemplary embodiment. FIG. 15 is an enlarged cross-section illustrating the vicinity of the seal ring 726 when mounted to a cross shaft coupling.

The present fifth exemplary embodiment has many common points to the first exemplary embodiment, and so only the points that differ from the first exemplary embodiment will be described. Parts of the present fifth exemplary embodiment that correspond to reference-numeral-appended parts already described in the first exemplary embodiment will be appended with reference numerals that are the corresponding reference numeral employed in the first exemplary embodiment to which a numerical value of "700" has been added. For example, the reference numeral "727" is appended to a core member in the present fifth exemplary embodiment corresponding to the core member 27 of the first exemplary embodiment.

The present fifth exemplary embodiment differs from the first exemplary embodiment in that a flange portion 727b is inclined with respect to a radial direction so as to be further away from a step face 717a of a cross shaft on progression toward the radial direction outside. Around the entire circumference, a step-face-side seal lip 734 extends from a radial direction outside portion of the flange portion 727b toward the step face 717a side. As illustrated in FIG. 14, the seal lip 734 has a smaller inner diameter and outer diameter as it approaches the step face 717a in a center axis line direction. An indentation 736 is formed at a radial direction inside of the seal lip 734.

An elastic member 728 is adhered to surfaces of the core member 727 except at a radial direction outer edge 727h of the flange portion 727b, and at a portion of the flange portion 727b where the indentation 736 is configured. The portions where the elastic member 728 is not adhered at the outer edge 727h and at the portion of the flange portion 727b where the indentation 736 is formed may be employed to center the core member 727 by being made to contact a mold when molding the elastic member 728.

As illustrated in FIG. 15, when the seal ring 726 has been mounted to a cross shaft, the seal lip 734 contacts the step face 717a, and elastically deforms toward a shaft section 718a, and enters the indentation 736. The interference of the seal lip 734 is thereby made larger, enabling stable and high sealing performance to be realized. Moreover, securing space for the seal lip 734 and making a seat 740 contact the step face of the cross shaft reliably, enables more stable and higher sealing performance to be realized.

Figure 16A:
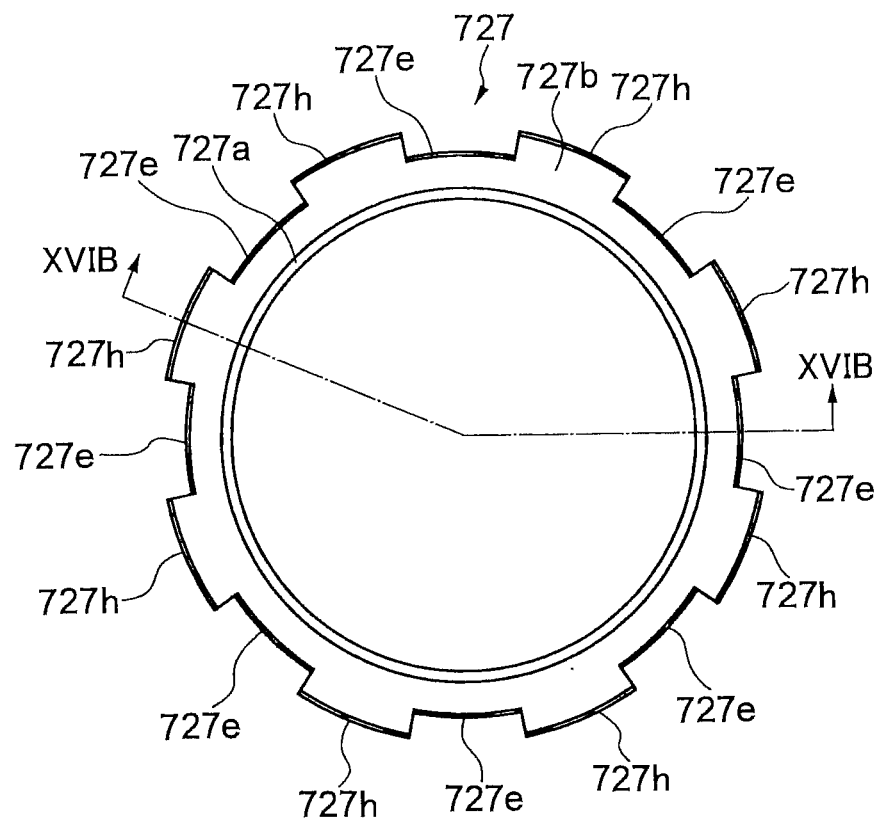
FIG. 16A is a plan view illustrating a core member of the seal ring according to the fifth exemplary embodiment of the present application.
Figure 16B:
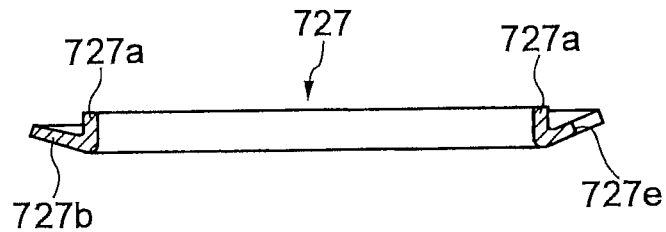
FIG. 16B is a cross-section taken along line XVIB-XVIB of FIG. 16A.

FIG. 16A is a plan view illustrating the core member 727 of the seal ring according to the fifth exemplary embodiment of the present application. FIG. 16B is a cross-section taken along line XVIB-XVIB of FIG. 16A.

An outer peripheral portion of the flange portion 727b includes radial direction indentations and protrusions. In other words the flange portion 727b includes plural cutouts 727e indented toward the radial direction inside. The cutouts 727e perform a role of integrating portions of a body 729 that are arranged on a bearing side of the flange portion 727b together with the seal lip 734 that is arranged on a step face 717a side of the flange portion 727b. There are eight of the cutouts 727e in the present exemplary embodiment, however the number of the cutouts 727e is not limited thereto. Moreover, the size, shape, and arrangement of the cutouts 727e is not limited to as illustrated in the present exemplary embodiment. There may be any freely selected number, size, shape, and arrangement cutouts 727e as long as they perform the role of integrating the body 729 and the fourth seal lip 734 together as described above.

Figure 17A:
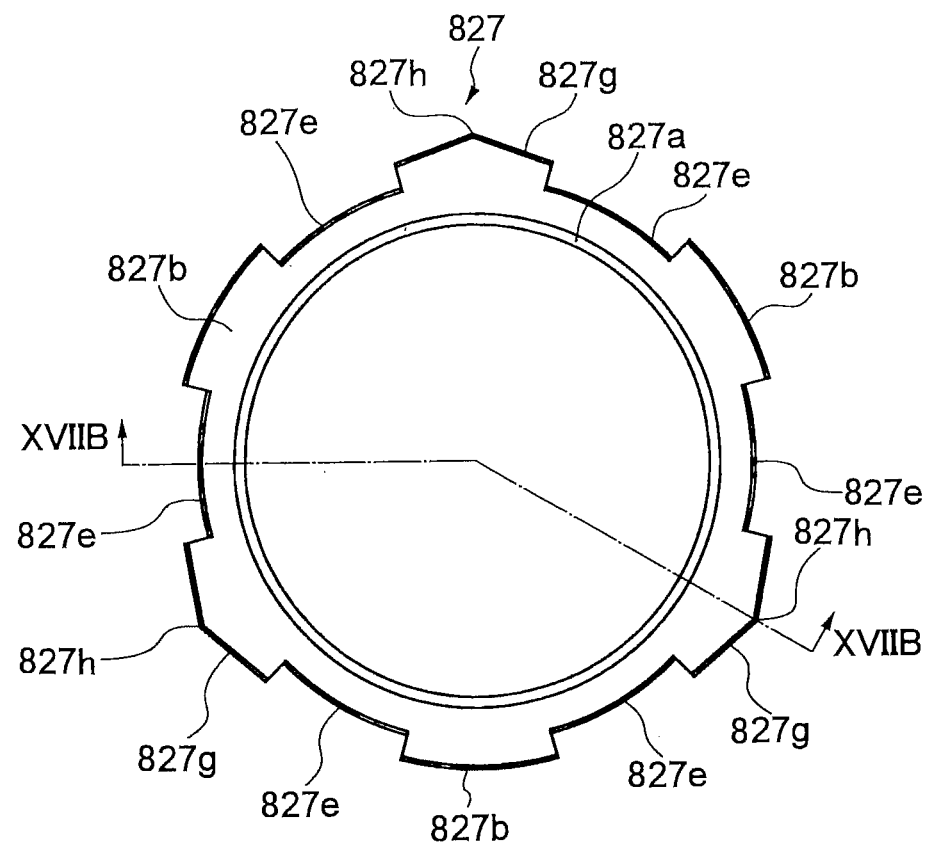
FIG. 17A is a plan view illustrating a modified example of a core member of a seal ring according to the fifth exemplary embodiment of the present application.
Figure 17B:
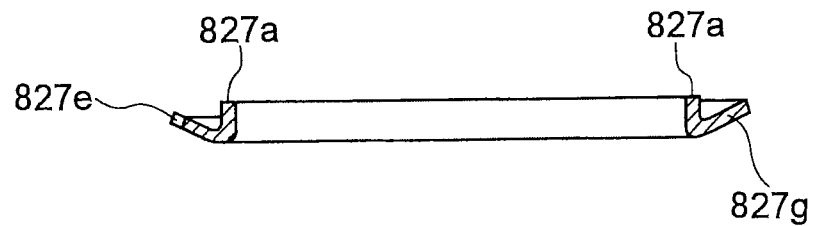
FIG. 17B is a cross-section taken along line XVIIB-XVIIB of FIG. 17A.

FIG. 17A is a plan view illustrating a core member 827 applicable to the seal ring 726 according to the fifth exemplary embodiment of the present application. Portions of the core member 827 corresponding to the core member 727 are appended with reference numerals that are the reference numerals appended to the core member 727 to which "100" has been added.

Instead of the radial direction outer edge 727h of the core member 727 as described in the fifth exemplary embodiment above, the core member 827 has an outer edge 827h having tips of three projections 827g that are separated from each other at substantially uniform spacings along a circumferential direction at positions furthest away from the center axis line in the radial direction. The projections 827g form radial direction outside portions of the flange portion 827b and each have a center that projects out further than two straight line edges thereof. The outer edge 827h enables the precision with which positioning of the core member 827 is performed to be raised by abutting a mold when molding the elastic member 828. The shape of the projections 827g is not limited to that described as long as they are capable of positioning the core member 827 in this manner. For example, portions of the flange portion 827b separated from each other at substantially uniform spacings along a circumferential direction may be configured with a higher radius of curvature at a radial direction outside edge portion than other portions so as to project out toward the radial direction outside. Moreover, a bump may be provided to respective portions of the flange portion 827b separated from each other at substantially uniform spacings along the circumferential direction.

Sixth Exemplary Embodiment

Figure 18:
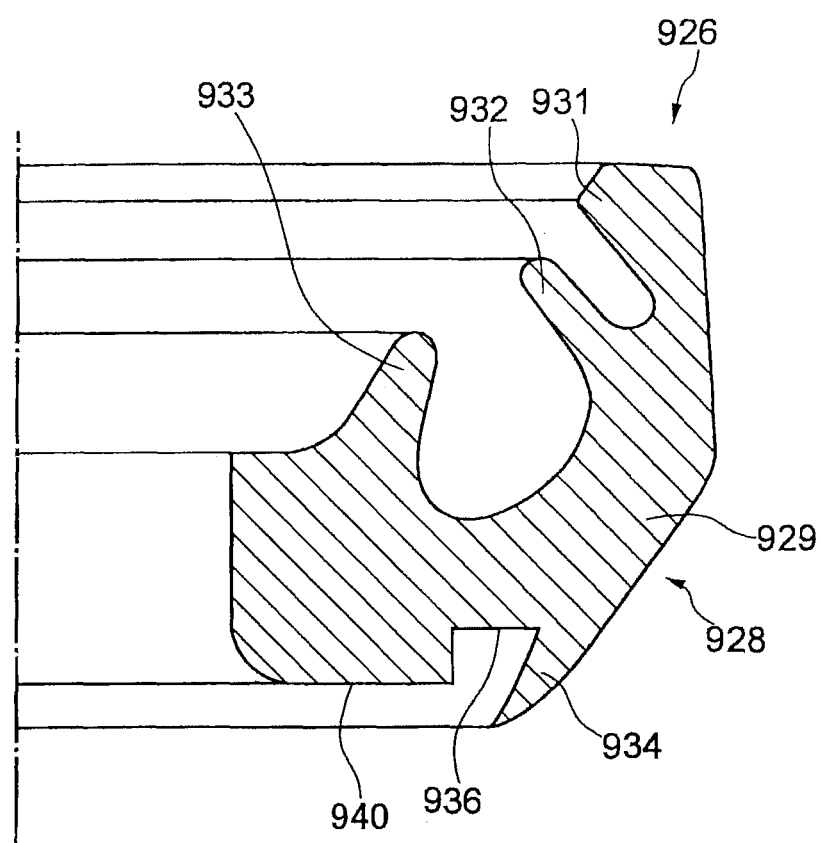
FIG. 18 is a cross-section of a seal ring according to a sixth exemplary embodiment of the present application.

Next, description follows regarding a sixth exemplary embodiment of the present application, with reference to FIG. 18. FIG. 18 is a cross-section of a seal ring 926 according to the sixth exemplary embodiment of the present application.

The sixth exemplary embodiment has many common points to the first exemplary embodiment, and so only the points that differ from the first exemplary embodiment will be described. Parts of the present sixth exemplary embodiment that correspond to reference-numeral-appended parts already described in the first exemplary embodiment will be appended with reference numerals that are the corresponding reference numeral employed in the first exemplary embodiment to which a numerical value of "900" has been added. For example, the reference numeral "940" is appended to a seat in the present sixth exemplary embodiment corresponding to the seat 40 of the first exemplary embodiment.

A seal ring 926 of the present sixth exemplary embodiment differs from the first exemplary embodiment in that all portions of the seal ring 926 are formed from an elastomer, without a core member being provided therein. Accompanying rotation of the seal ring 926 together with a bearing cup is more likely to occur in cases in which a core member is not provided. To address this issue, in the present sixth exemplary embodiment the volume of the elastomer is increased to achieve a larger interference with the cross shaft. A frictional force arising between the cross shaft and the seal ring 926 is accordingly at least double the frictional force arising between bearing cup and the seal ring 926, which prevents such accompanying rotation.

According to the present sixth exemplary embodiment, a step-face-side seal lip 934 enters an indentation 936 when the seal ring 926 has been mounted to a cross shaft. A larger interference of the seal lip 934 is thereby achieved, enabling stable and high sealing performance to be realized. Moreover, securing space for the seal lip 934 and making the seat 940 contact the step face of the cross shaft reliably, enables more stable and higher sealing performance to be realized.

The seal ring of the present application can thereby be configured in this manner without any core member at all, however the seal ring may also be configured with just part of one of the core members of the first to sixth exemplary embodiments. For example, a configuration may be adopted in which the core member 27 does not include the cylindrical portion 27a in the first exemplary embodiment, or a configuration may be adopted in which the core member 27 does not include the flange portion 27b therein.

Figure 19:
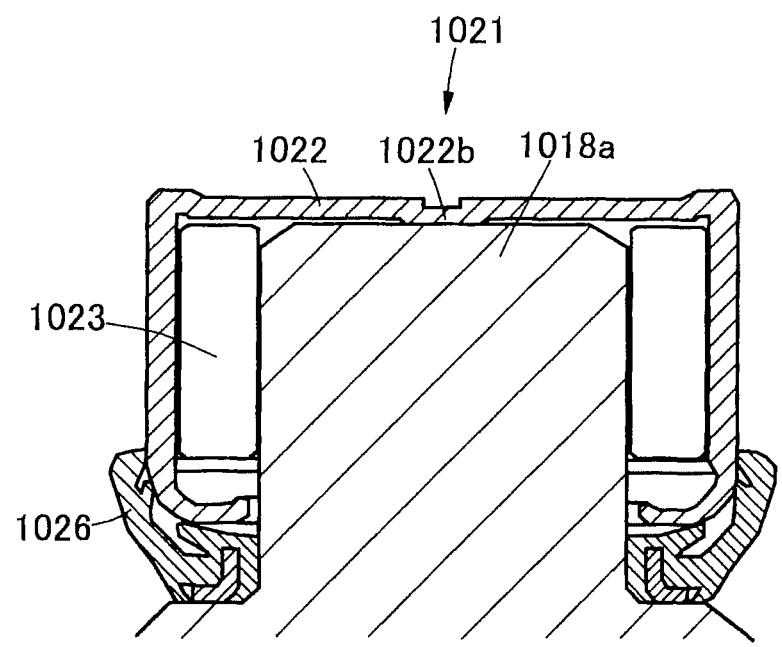
FIG. 19 is an enlarged cross-section illustrating another bearing that may be employed in a cross shaft coupling of the present application together with a shaft section of a cross shaft therein.

Next, description follows regarding a combination of another bearing 1021 that may be employed in a cross shaft coupling of the present application combined with a shaft section 1018a of a cross shaft therein, with reference to FIG. 19. FIG. 19 is an enlarged cross-section illustrating the bearing 1021 that may be employed in a cross shaft coupling of the present application and the shaft section 1018a therein.

The bearing 1021 and the shaft section 1018a have many common points to the bearing 21 and the shaft section 18a of the first exemplary embodiment, and so only the points that differ from the first exemplary embodiment will be described. Parts that correspond to reference-numeral-appended parts already described in the first exemplary embodiment will be appended with reference numerals that are the corresponding reference numeral employed in the first exemplary embodiment to which a numerical value of "1000" has been added. For example, the reference numeral "1022" is appended to a bearing cup for the bearing 1021, corresponding to the bearing cup 22 of the first exemplary embodiment.

The bearing 1021 and the shaft section 1018a are not provided with the pin 24 and the insertion hole 18e of the first exemplary embodiment, and instead a protrusion 1022b is provided so as to project out from a center of a cup-bottom of the bearing cup 1022 toward the shaft section 1018a side. The bearing 1021 and the shaft section 1018a enable the precision of positioning the bearing 1021 in the center axis line direction to be raised. The bearing 1021 is accordingly arranged at an appropriate position with respect to a seal ring 1026, enabling a more stable and higher sealing performance to be realized.

The exemplary embodiments of the present application described above enable the provision of a seal giving excellent sealing performance, and the provision of a cross shaft coupling, intermediate shaft assembly, and steering device of the same.

Note that the invention of the present application is not limited to the exemplary embodiments described above, and various modifications are possible. For example, the number of seal lips on the seal is not limited to four, and may be two, three, or five or more, as long as this includes a seal lip to contact the step face of a cross shaft, and a seal lip to contact a bearing cup.

Moreover, a configuration may be adopted in which an indentation is formed at a radial direction outside of a step-face-side seal lip, with the seal lip elastically deforming toward the radial direction outside when mounting to a cross shaft has been performed.

Moreover, there is no need for a portion other than the seal lip to contact the step face of the cross shaft as long as the step-face-side seal lip contacts the step face of the cross shaft. Namely, a configuration without a seat may be adopted.

Moreover, the radial direction arrangement of the seal lip, indentation, and seat are not limited to the arrangements in the exemplary embodiments described above. Any arrangement may be adopted therefor as long as there is an adjacent indentation at a side toward which the seal lip deforms when the seal has been mounted to the cross shaft.

Moreover, the seat does not need to be configured by part of the core member. A seat may be configured instead by an elastic member portion.

The core member, moreover, does not need to always include a positioning portion.

EXPLANATION OF THE REFERENCE NUMERALS 1 steering wheel
2 steering shaft
3 steering column
4 vehicle-body-side bracket
5 first cross shaft coupling
6 intermediate shaft
7 second cross shaft coupling
8 pinion gear
9 rack shaft
11 first yoke
12 second yoke
13 third yoke
14 fourth yoke
11a, 12a, 13a, 14a pair of arms
16 cross shaft
17 center section
17a, 217a, 517a, 717a step face
18a, 18b, 18c, 18d, 1018a shaft section
18e insertion hole
21, 1021 bearing
22, 1022 bearing cup
22a inner curved portion
1022b protrusion
23, 1023 roller
24 pin
26, 226, 326, 426, 526, 626, 726, 926, 1026 seal ring
27, 227, 327, 427, 527, 627, 727, 827 core member
27a, 227a, 327a, 427a, 527a, 627a, 727a, 827a cylindrical portion
27b, 227b, 327b, 427b, 527b, 627b, 727b, 827b flange portion
27c, 227c, 327c, 427c, 527c, 627c positioning portion
327d annular portion
727e, 827e cutout
527f, 627f curved portion
827g projection
727h, 827h outer edge
28, 228, 328, 428, 528, 628, 728, 928 elastic member
29, 229, 329, 429, 529, 629, 729, 929 body
31, 231, 331, 431, 531, 631, 731, 931 first seal lip
32, 232, 332, 432, 532, 632, 732, 932 second seal lip
33, 233, 333, 433, 533, 633, 733, 933 third seal lip 34, 234, 334, 434, 534, 634, 734, 934 seal lip
36, 336, 536, 636, 736, 936 indentation
40, 340, 540, 640, 740, 940 seat
100 steering device
200 vehicle body
300 intermediate shaft assembly

The invention claimed is:

1. A seal ring configured to be employed
with a cross shaft including a center section and four shaft sections extending in four directions from the center section and formed with step faces where the center section widens out from base ends of the shaft sections outward in radial directions of the shaft sections, and
with bearings for mounting to the shaft sections,
by the seal ring fitting over the shaft section and being interposed between the bearing and the step face;
the seal comprising
a seal lip configured to contact the step face; and
an indentation the seal lip enters when the seal lip is deformed by the contact;
a circular ring shape core member having a higher rigidity than that of other portions;
the core member including a flange portion widening out in a radial direction around an entire circumference of the core member; and
an outer peripheral portion of the flange portion including radial direction indentations and projections.

2. The seal ring according to claim 1, wherein the seal lip contacts the step face and deforms toward a radial direction inside.

3. The seal ring according to claim 1, further comprising a seat configured to contact the step face.

4. The seal ring according to claim 3, wherein the seal lip, the indentation, and the seat are disposed in this sequence as a sequence from the radial direction outside.

5. The seal ring according to claim 3, wherein a portion of the core member configures the seat.

6. The seal ring according to claim 1, wherein the core member includes a positioning portion exposed toward the shaft section radial direction outside or inside.

7. The seal ring according to claim 3, wherein the seat includes a portion of the core member projecting further toward the step face side than the flange portion.

8. The seal ring according to claim 1, wherein the core member includes a reinforcement portion disposed at a radial direction inside of the flange portion and having a center axis line direction dimension greater than that of the flange portion around an entire circumference.

9. A cross shaft coupling comprising the seal ring according to claim 1.

10. An intermediate shaft assembly comprising the cross shaft coupling ring according to claim 9.

11. The intermediate shaft assembly according to claim 10 wherein the intermediate shaft assembly has been subjected to plating.

12. A steering device comprising the intermediate shaft assembly according to claim 10.

13. A seal ring configured to be employed
with a cross shaft including a center section and four shaft sections extending in four directions from the center section and formed with step faces where the center section widens out from base ends of the shaft sections outward in radial directions of the shaft sections, and
with bearings for mounting to the shaft sections,
by the seal ring fitting over the shaft section and being interposed between the bearing and the step face;
the seal comprising
a seal lip configured to contact the step face; and
an indentation the seal lip enters when the seal lip is deformed by the contact;
a seat configured to contact the step face;
a circular ring shape core member having a higher rigidity than that of other portions;
a portion of the core member configuring the seat;
the core member including a flange portion widening out in a radial direction around an entire circumference of the core member;
an outer peripheral portion of the flange portion including radial direction indentations and projections.

14. The seal ring according to claim 13, wherein the seal lip contacts the step face and deforms toward a radial direction inside.

15. The seal ring according to claim 13, wherein the seal lip, the indentation, and the seat are disposed in this sequence as a sequence from the radial direction outside.

16. The seal ring according to claim 13, wherein the core member includes a positioning portion exposed toward the shaft section radial direction outside or inside.

17. A seal ring configured to be employed
with a cross shaft including a center section and four shaft sections extending in four directions from the center section and formed with step faces where the center section widens out from base ends of the shaft sections outward in radial directions of the shaft sections, and
with bearings for mounting to the shaft sections,
by the seal ring fitting over the shaft section and being interposed between the bearing and the step face;
the seal comprising
a seal lip configured to contact the step face; and
an indentation the seal lip enters when the seal lip is deformed by the contact;
a seat configured to contact the step face;
a circular ring shape core member having a higher rigidity than that of other portions;
a portion of the core member configuring the seat;
the core member including a positioning portion exposed toward the shaft section radial direction outside or inside;
the core member including a flange portion widening out in a radial direction around an entire circumference of the core member; and
an outer peripheral portion of the flange portion including radial direction indentations and projections.

18. The seal ring according to claim 17, wherein the seal lip contacts the step face and deforms toward a radial direction inside.

19. The seal ring according to claim 17, wherein the seal lip, the indentation, and the seat are disposed in this sequence as a sequence from the radial direction outside.

20. The seal ring according to claim 17, wherein the seat includes a portion of the core member projecting further toward the step face side than the flange portion.

* * * * *